(12) United States Patent
Yazdy

(10) Patent No.: US 8,488,186 B2
(45) Date of Patent: Jul. 16, 2013

(54) GRADUAL CHARGE PUMP TECHNIQUE FOR OPTIMIZING PHASE LOCKED LOOP (PLL) FUNCTION IN SUB-PIXEL GENERATION FOR HIGH SPEED LASER PRINTERS SWITCHING BETWEEN DIFFERENT SPEEDS

(75) Inventor: Mostafa R. Yazdy, Los Angeles, CA (US)

(73) Assignee: Xerox Corporation, Norwalk, CT (US)

( * ) Notice: Subject to any disclaimer, the term of this patent is extended or adjusted under 35 U.S.C. 154(b) by 1568 days.

(21) Appl. No.: 11/657,358

(22) Filed: Jan. 24, 2007

(65) Prior Publication Data

US 2008/0174794 A1    Jul. 24, 2008

(51) Int. Cl.
G06K 15/12 (2006.01)
G06F 3/12 (2006.01)
H04N 1/29 (2006.01)
H04N 1/40 (2006.01)
H04N 1/46 (2006.01)

(52) U.S. Cl.
USPC ........... 358/1.7; 358/1.15; 358/300; 358/443; 358/530

(58) Field of Classification Search
USPC ............ 358/1.2, 1.5, 1.7, 1.9, 1.13, 300, 358/301, 302, 443, 501, 530
See application file for complete search history.

(56) References Cited

U.S. PATENT DOCUMENTS

| | | | |
|---|---|---|---|
| 4,837,636 A * | 6/1989 | Daniele et al. | 358/300 |
| 5,361,123 A * | 11/1994 | Yeh et al. | 399/50 |
| 5,471,314 A * | 11/1995 | Orlicki et al. | 358/296 |
| 5,493,374 A * | 2/1996 | Smith et al. | 399/322 |
| 5,502,419 A * | 3/1996 | Kawasaki et al. | 332/109 |
| 5,517,230 A * | 5/1996 | Lofthus et al. | 347/235 |
| 5,530,642 A * | 6/1996 | Lofthus et al. | 700/69 |
| 5,610,646 A * | 3/1997 | Isaka et al. | 347/131 |
| 5,629,696 A * | 5/1997 | Kawasaki et al. | 341/101 |
| 5,640,131 A * | 6/1997 | Kawasaki et al. | 332/109 |
| 5,889,534 A * | 3/1999 | Johnson et al. | 347/19 |
| 5,926,047 A * | 7/1999 | Harrison | 327/159 |
| 6,133,932 A * | 10/2000 | Webb et al. | 347/232 |
| 6,151,152 A * | 11/2000 | Neary | 359/216.1 |
| 6,173,432 B1 * | 1/2001 | Harrison | 716/1 |
| 6,184,916 B1 * | 2/2001 | Cianciosi | 347/255 |
| 6,288,574 B1 * | 9/2001 | Neary | 327/12 |
| 6,529,055 B1 * | 3/2003 | Neary | 327/156 |
| 6,771,919 B2 * | 8/2004 | Koide | 399/167 |
| 6,900,676 B1 * | 5/2005 | Tamura | 327/156 |
| 6,914,619 B2 * | 7/2005 | Koide | 347/154 |
| 6,940,536 B2 * | 9/2005 | Rauch et al. | 347/249 |
| 6,947,515 B2 * | 9/2005 | Neary | 375/376 |
| 7,012,849 B2 * | 3/2006 | Otose | 365/189.15 |
| 7,042,259 B2 * | 5/2006 | Kurd et al. | 327/147 |
| 7,665,816 B2 * | 2/2010 | Otose | 347/9 |
| 2003/0151753 A1* | 8/2003 | Li et al. | 358/1.9 |
| 2006/0215188 A1 | 9/2006 | Yazdy | |
| 2006/0244979 A1 | 11/2006 | Yazdy et al. | |

OTHER PUBLICATIONS

U.S. Appl. No. 11/657,204, filed Jan. 24, 2007, Yazdy.

* cited by examiner

Primary Examiner — Twyler Haskins
Assistant Examiner — Jonathan Beckley
(74) Attorney, Agent, or Firm — Fay Sharpe LLP

(57) ABSTRACT

Methods and apparatus for optimizing the phase lock loop circuitry of sub-pixel clock generators for situations where frequent switching between different system printing speeds, and hence clock frequencies are required. A timing control logic circuitry is associated with the sub-pixel clock generator for a graduated change in charge pump current. The timing control logic circuitry comprises a plurality of current generators serially connected with the charge pump current via associated switches for the selective adjustment of charge pump current in a graduated manner.

4 Claims, 4 Drawing Sheets

GRADUAL CHARGE PUMP TECHNIQUE FOR OPTIMIZING PHASE LOCKED LOOP (PLL) FUNCTION IN SUB-PIXEL GENERATION FOR HIGH SPEED LASER PRINTERS SWITCHING BETWEEN DIFFERENT SPEEDS

TECHNICAL FIELD

The present invention relates generally to electrophotographic printing machines, and more particularly, to raster output scanners in electrophotographic printing machines.

BACKGROUND

Generally, the process of electrophotographic printing includes charging a photoconductive member to a substantially uniform potential to sensitize its surface. The charged portion of the photoconductive surface is exposed to a light image from a scanning laser beam or a LED diode that corresponds to an original document or image being reproduced. The effect of the light on the charged surface produces an electrostatic latent image on the photoconductive surface.

After the electrostatic latent image is recorded on the photoconductive surface, the latent image is developed. Two-component and single-component developer materials are commonly used for development. A typical two-component developer comprises a mixture of magnetic carrier granules and toner particles that adhere triboelectrically to the latent image. A single-component developer material is typically comprised of toner particles without carrier particles. Toner particles are attracted to the latent image, forming a toner powder image on the latent image of the photoconductive surface. The toner powder image is subsequently transferred to a copy sheet. Finally, the toner powder image is heated to permanently fuse it to the copy sheet to form the hard copy image.

In color electrophotographic printers, one or more Raster Output-Scanner (ROS) units are positioned adjacent to a moving photoreceptor belt surface or the like and are selectively energized to generate successive image exposures. Each of the latent images is representative of one of a plurality of different color separation images. Development of the color separation latent images and the transfer of the developed image to an output media define a multi-color image. The color separation images may define, for example, yellow, magenta, cyan, and black color images that, upon subtractive combination on the output media, produce a visible representation of the multi-color image. When an observer looks at the output media, the human eye integrates the light reflections from the color component images into shades of color.

For a color imaging cycle, the printer generates a component image exposure for each color component of the desired output image. For full color images, four component images may be generated, one component image for each of the three basic colors and a fourth for black images. Each component image is transferred to the moving photoconductive surface by modulating the light source of an ROS as it moves across the moving photoconductor to selectively discharge the photoconductor in an image-wise pattern. The modulation control of the laser or LED of the ROS is provided by the video data. For each color component image, the value of an image data byte is used to enable or disable the laser or LED that illuminates the photoreceptor for one pixel timing period. If the data value is less than a threshold value, the LED or laser is not operated for one pixel period. If the data value indicates that a pixel is to be generated, then the LED or laser is operated for one pixel period.

An ROS that generates a series of pixels comprising a color component image places the color component image it generates in overlying registration with the other color component images. These overlapping images are composed of a series of closely spaced pixels that are nominally spaced 5 microns apart. When these component images are developed at development stations to transfer toner particles of different colors to the component images, a composite color image is formed. This composite color image is then transferred to an output sheet. Thus, the quality of color image perceived by the observer relies upon the precise registration of the component image pixels.

In some electrophotographic imaging systems, the latent images of the component image are formed and developed on top of one another in a common imaging region of the photoconductor. The latent images generated in the common imaging region may be formed and developed during multiple passes of the photoconductor around a continuous transport path. Alternatively, the latent images can be formed and developed in a single pass of the photoconductor around the continuous transport path. A single-pass system enables multi-color images to be assembled at extremely high speeds. In either type of imaging systems, accurate placement of the color separation image pixels in the latent image is important for image quality.

One problem with the pixels generated by these types of ROS devices is the lack of precision regarding the size and placement of the pixels. Because the entire data byte is mapped to only one value, either an on or off value, only one of two types of pixels may be produced. Therefore, the data bytes for an image may define pixels of different densities, but the ROS is only able to generate a pixel that is either on for the full duration of a pixel clock cycle or off for the same period of time. Consequently, some of the data content for an image is lost in the process of generating a latent image from a set of image data.

In order to enhance the quality of an image in high speed color laser printers, it is necessary to control the size of the pixels. This is done by changing the timing and the duration of the laser beam for each particular pixel. The technique to provide such a function is called "Sub-Pixel Generation".

Published Application No. 2006/0215188 A1, Sep. 28, 2006, herein incorporated by reference, discloses a method and system for sub-pixel generation in a high speed laser electrophotographic system. The output of the sub-pixel generating circuit disclosed therein as applied to the ROS is officially adjusted for each pixel in order to control pixel size. This system can be advantageously implemented in a full custom mixed-mode (analog/digital) integrated chip (SPG chip). However, such a full-custom chip is optimized for one particular desired printing speed and also comprises for the higher speeds of present electrophotographic laser systems, a rather delicate and expensive custom-made chip circuit.

As alternative printing system speeds may be desired, there is a need for advantageously still utilizing the foregoing existing SPG custom chip, but for generating different speeds, which would avoid having to develop a new full custom specialized integrated chip for each desired speed.

Accordingly, it is desired to utilize an existing SPG chip for different or higher speeds with changing only a few off-chip components that may be associated with the chip so that a system can be utilized which quickly and inexpensively switches between the different printing speeds.

SUMMARY

According to aspects illustrated herein there is provided a switchable ROS driver circuit for an electrophotographic system for selective switching between a plurality of system printing speeds. A sub-pixel clock generator is tuned to a first reference signal corresponding to a first printing system speed, and includes a phase lock loop circuit and a charge pump circuit for setting an input voltage at a voltage control oscillator (VCO) to generate a desired frequency corresponding to the first system printing speed. A control circuit is associated with the sub-pixel clock generator for selective and incremental adjustment of the input voltage to the VCO for generating an other desired frequency corresponding to a second system printing speed. An ROS light source in operative communication with the sub-pixel clock generator controls the sub-pixel generation. The control circuit comprises a plurality of current generators respectively disposed in parallel with the output of the charge pump circuit for incrementally and gradually increasing the current of the charge pump circuit and thereby gradually adjusting the VCO input voltage for generating the other desired system printing speed while avoiding VCO voltage saturation or undesirable flutter extremes within a reasonable settling time.

According to other aspects disclosed herein, a method is provided for switching an ROS driver circuit for an electrophotographic system for selective switching of system printing speeds. A first reference signal corresponding to a first system printing speed is applied to a pixel clock generator disposed to set an input voltage at a VCO in communication with an ROS light source for generating a first desired frequency corresponding to the first system printing speed. The input voltage to the VCO comprises an output from a charge pump circuit. The output of the charge pump circuit is adjusted in graduated adjustments for generating a second input voltage to the VCO for generating a second desired frequency corresponding to a second system printing speed. The VCO output frequency corresponding to the second system printing speed is communicated to the ROS light source. The adjusting comprises the selective switching of a plurality of current generators associated with the output of the charge pump circuit in a graduated time-spaced manner whereby jitter and saturation of the VCO are avoided.

DETAILED DESCRIPTION

Figure 1:
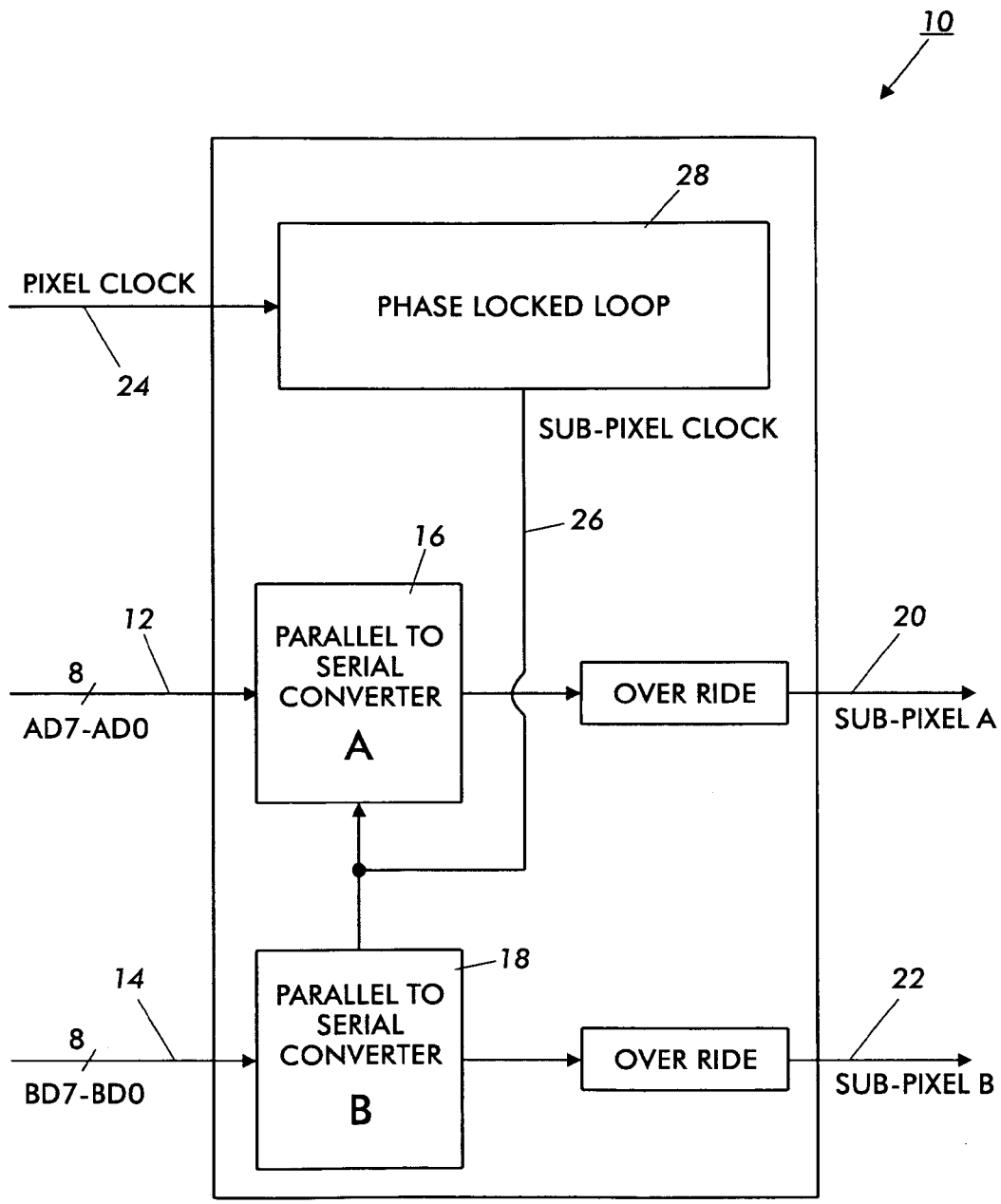
FIG. 1 is block diagram of a sub-pixel clock generator.

With reference to FIG. 1, a sub-pixel clock generator processor 10 is shown wherein eight-bit signals (in a parallel format called the Video Data A 12 and Video Data B 14 for a dual-channel ROS system) are applied to parallel-to-serial converter circuitry 16,18, respectively, to generate the output signals sub-pixel A 20 and sub-pixel B 22. The output signals are applied to the laser drivers in the ROS to turn on the laser beam. The duration of the laser beam in each on state depends on the width of the output signal pulses. The parallel-to-serial converters 16,18 require an internal clock signal eight times faster than the pixel clock 24 to control the maximum duration of the output pulses for the sub-pixel generation. The internal clock of the converters requires a sub-pixel clock 26 that is generated by the phase lock loop (PLL) circuit 28.

Figure 2:
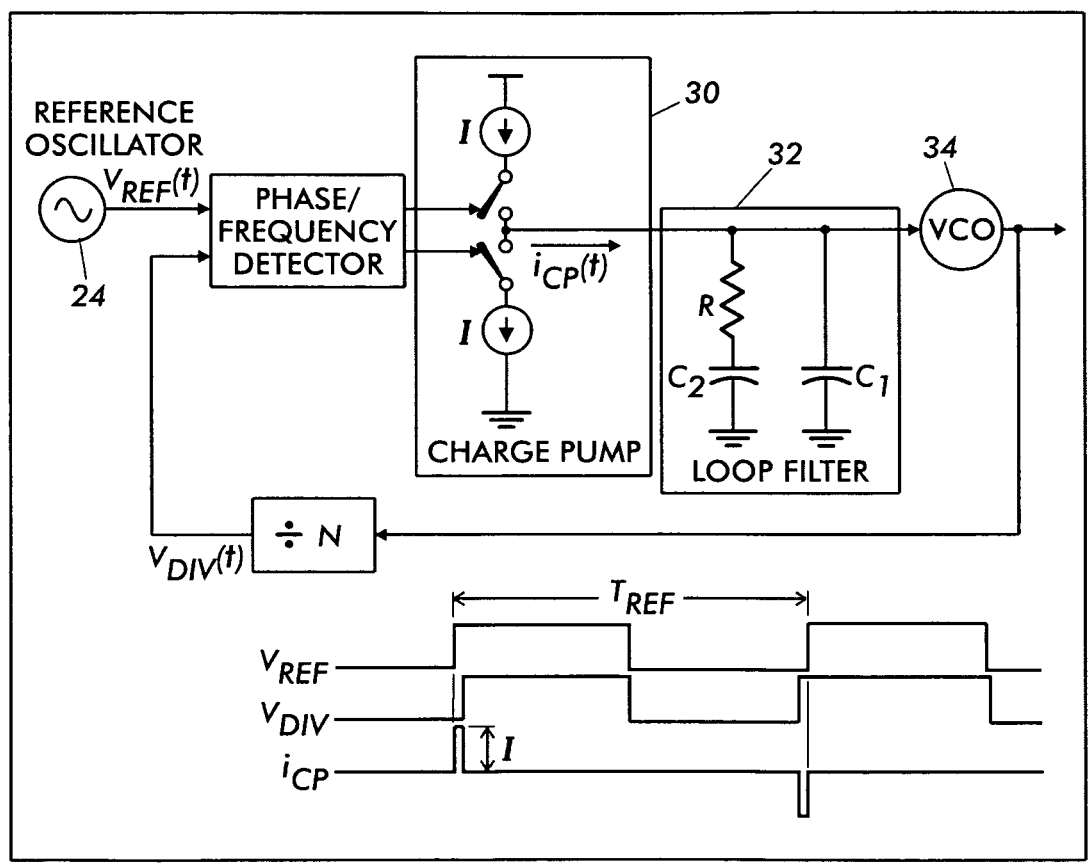
FIG. 2 is a phase lock loop component of the generator of FIG. 1.

With reference to FIG. 2, the PLL part of the SPG chip is optimized for a specific system printing speed by the pixel clock signal 24. For example, a system speed of 100 pages per minute (ppm) may require a pixel clock of 54 MHz. The sub-pixel clock frequency 26 is eight times faster than the pixel clock (432 MHz which is 8×54 MHz). The PLL includes a charge pump circuit 30 and a loop filter circuit 32 for communicating a charge pump current, ($i_{cp}$) to the VCO 34. The charge pump current charges up the capacitors of the loop filter circuit 32 to provide the voltage necessary to set the frequency in the VCO 34.

As noted above, when a change in a system's printing speed, for example from 100 ppm to 135 ppm, is desired, there needs to be a change in the charge pump current to adjust the voltage to the VCO to adjust laser pulse durations. For the 135 ppm a clock frequency should be increased to about 68 MHz so that the new "sub-pixel" clock signal 26 would be 524 MHz (8×68 MHz). If the charge pump circuit were to experience a sudden change between the 54 MHz clock and the 68 MHz clock (changing system printing speed from 100 ppm to 135 ppm) such a sudden change in the charge pump current can cause overshoots in the input voltage of the VCO, causing VCO saturation, longer settling time and more jitter.

More particularly, as shown in FIG. 2, the charge pump circuitry 30 provides the current for the loop filter circuit 32 which in turn provides the controlling voltage for the VCO to set the frequency for a VCO clock, which is used as the sub-pixel clock signal 26. For higher speeds, more current from the charge pump circuit must be available for charging up the capacitor in the loop filter 32. However, any increase in this current needs to be effected cautiously because too much current and, more importantly, too sudden a change in the value of the current from the charge pump circuitry, can cause jitter and instability and deteriorate the settling time of the PLL. For example, if the VCO is working between 0 and 5 volts, for a 100 ppm system printing speed, the input voltage to the VCO should be 1.5 volts. To get the desired output frequency for the 135 ppm system printing speed there would be an increase in the voltage value in the adjustment to approximately 2 volts. In transition between the different voltage levels to the VCO it is not uncommon to generate voltage spikes up to the system voltage limit, 5 volts, before there is a settling down to the desirable voltage of 2 volts. Such saturating spikes to the VCO disable the clock frequency to the point that there can be no printing until the proper frequency has been realized after a certain settling time. The jumping up and down of the voltage is called "jitter" and the time that it takes for the jitter to end is called a "settling time".

Figure 3:
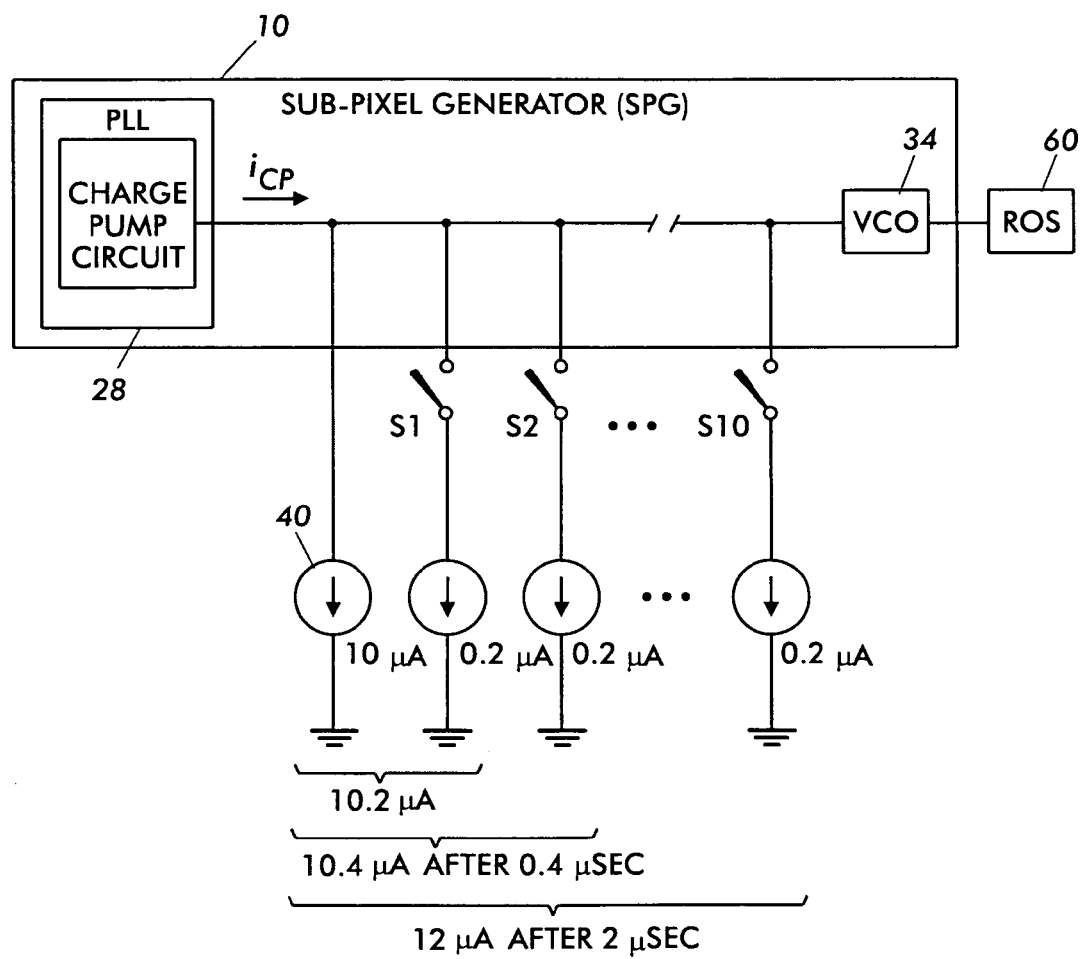
FIG. 3 shows a timing and control logic circuit associated with the sub-pixel clock generator.
Figure 4:
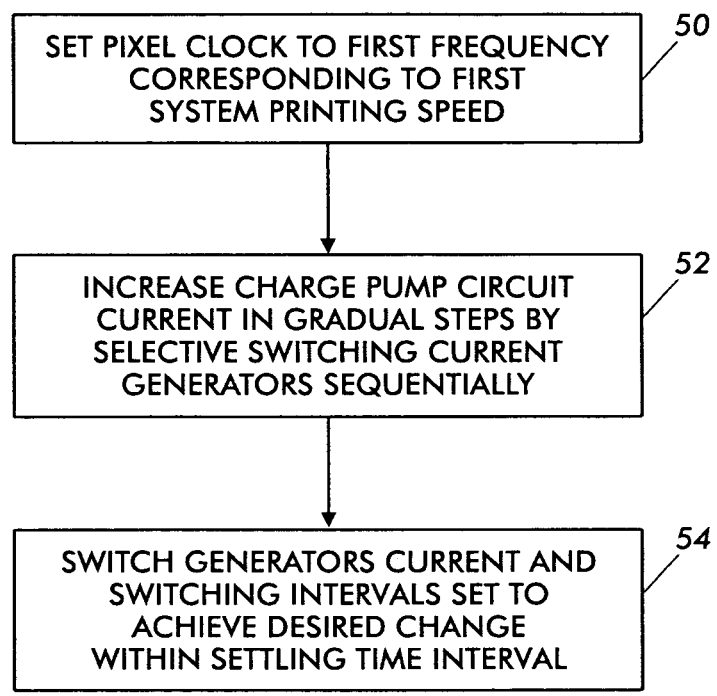
FIG. 4 is a flow chart illustrating a process for graduated switching between different frequencies in a sub-pixel clock generator.

With reference to FIGS. 3 and 4, when the charge pump current corresponds to the first system printing speed of 100 ppm 50, all switches S1 through S10 are open so that only a 10 uA current 40 occurs. After 0.2 uSec., a switch S1 is closed 52 adding another 0.2 uA of current to the charge pump current so that the charge pump current is effectively 10.2 uA. The other switches S2-S10 are similarly consecutively closed sequentially after another 0.2 uSec. thereby sequentially adding 0.2 uA to the current so that within the 2.0 uSec. required settling time, a graduated change increase 54 in the charge pump current can be realized. Of course, the present circuitry is merely presented as an exemplary illustration. The number of switches, the charge pump current increases and the sequential intervals between closing the switches can vary as desired for effecting the ultimately intended change in system printing speed. Also, a decrease in charge pump circuit current can be achieved by the graduated opening of the switches.

An advantage of the subject timing control logic circuitry of FIG. 3 is that the SPG chip, although initially tuned to a first pixel clock frequency, can have its output adjusted by the timing control logic circuitry to another pixel clock speed for the desired adjustment of the ROS fight source 60.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A switchable raster output scanner (ROS) driver circuit for an electrophotographic system for selective switching between a plurality of system printing speeds comprising:
    a sub-pixel clock generator tuned to a first reference signal corresponding to a first printing system speed and including a phase locked loop circuit and a charge pump circuit, wherein the charge pump circuit charges a loop filter circuit and sets a first input voltage at a voltage-controlled oscillator (VCO), wherein the VCO to generate a desired frequency corresponding to the first system printing speed, and wherein an input voltage to the VCO is set by a loop filter circuit provided with a charge pump current output by a charge pump circuit;
    a control circuit associated with the sub-pixel clock generator comprising a plurality of current generators respectively disposed in parallel with the charge pump current output by the charge pump circuit for selective and incremental adjustment of the first input voltage to a second input voltage to the VCO for generating another desired frequency corresponding to a second system printing speed; and
    an ROS light source in operative communication with the sub-pixel clock generator for sub-pixel control of an ROS light source.

2. The driver circuit of claim 1 wherein, except for a first current generator, each current generator is serially connected with a switch respectively interposed between the each current generator and the output of the charge pump circuit.

3. The driver circuit of claim 2 further including a timing control circuit for selective switching of the interposed switches in predetermined increments for the gradual adjustment of the output of the charge pump circuit from the VCO input voltage corresponding to the first system printing speed, to a charge pump output corresponding to an input voltage to the VCO that generates the other desired frequency corresponding to the second system printing speed.

4. A method for a raster output scanner (ROS) driver circuit for an electrophotographic system for selective switching of system printing speeds, comprising:
    applying a first reference signal generated by a phase lock loop charge pump circuit corresponding to a first system printing speed to a sub-pixel clock generator disposed to set an- input voltage at a voltage-controlled oscillator (VCO) in communication with an ROS light source for generating a first desired frequency corresponding to the first system printing speed,
    wherein an input voltage to the VCO is set by a loop filter circuit provided with a charge pump current output by a charge pump circuit;
    adjusting the charge pump current of the charge pump circuit in graduated adjustments with a plurality of current generators respectively disposed in parallel with the charge pump current output by the charge pump circuit for generating a second input voltage to the VCO for generating a second desired frequency corresponding to a second system printing speed, and
    communicating the VCO output frequency corresponding to the second system printing speed to the ROS light source, whereby this charge pump circuit is operationally consistent despite the adjusting.

\* \* \* \* \*